United States Patent [19]

Fairman

[11] Patent Number: 4,846,418
[45] Date of Patent: Jul. 11, 1989

[54] FILM CASSETTE

[75] Inventor: Patricia D. Fairman, Rochester, N.Y.

[73] Assignee: Eastman Kodak Company, Rochester, N.Y.

[21] Appl. No.: 185,001

[22] Filed: Apr. 22, 1988

Related U.S. Application Data

[63] Continuation-in-part of Ser. No. 173,392, Mar. 25, 1988, abandoned.

[51] Int. Cl.$^4$ ............................................. G03B 17/26
[52] U.S. Cl. .................................. 242/71.1; 242/71.9; 242/73; 354/275
[58] Field of Search .................... 242/71, 71.1, 71.2, 242/71.9, 71.8, 73; 354/275

[56] References Cited

U.S. PATENT DOCUMENTS

| | | | |
|---|---|---|---|
| 2,541,476 | 2/1951 | Mihalyi | 242/71.1 |
| 3,556,435 | 1/1971 | Wangerin | 242/71.1 |
| 3,659,799 | 5/1972 | Cerutti et al. | 242/71.1 |
| 4,145,133 | 3/1979 | Wareham | 242/71.1 X |
| 4,407,579 | 10/1983 | Huff | 354/275 |
| 4,445,768 | 5/1984 | Gold | 354/275 |

Primary Examiner—Stuart S. Levy
Assistant Examiner—Steven M. duBois
Attorney, Agent, or Firm—Roger A. Fields

[57] ABSTRACT

In a 35 mm film cassette, the leading end of a film roll coiled about a film spool is located within the cassette shell. The film spool is comprised of two pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to clamp the film roll at its opposite sides. As a result, the leading end of the film roll will be rotated past a stripper-guide which strips the leading end from between the flanges and guides it through a light-trapped opening in the cassette shell. Thus rotation of the film spool in the unwinding direction will advance the leading end to the outside of the film cassette.

9 Claims, 3 Drawing Sheets

FILM CASSETTE

CROSS-REFERENCE TO RELATED APPLICATION

This application is a continuation-in-part application of prior application Ser. No. 173,392, filed Mar. 25, 1988, by the same inventor and abandoned as of the filing date of this application.

BACKGROUND OF THE INVENTION

1. Field of the Invention

The invention relates generally to the field of photography, and particularly to a film cassette containing a film roll. More specifically, the invention relates to a film cassette wherein a leading end of the film roll can easily be advanced from within the film cassette to the outside of the cassette.

2. Description of the Prior Art

In the standard 35 mm film manufacturers' cassette, such as manufactured by Eastman Kodak Co. and Fuji Photo Film Co., Ltd., the filmstrip is wound on a flanged spool which is rotatably supported within a cylindrical shell. A leading end section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in a film unwinding direction, the film roll inside the shell will tend to expand radially since the inner end of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus rotation of the spool in the unwinding direction cannot serve to advance the filmstrip out of the shell, and it is necessary to engage the protruding leader section to draw the filmstrip out of the shell.

If in the standard 35 mm film manufacturers' cassette, the film spool is rotated in a winding direction sufficiently to draw the protruding leader section of the filmstrip completely to within the cassette shell, it is very difficult to retrieve the leader section. U.S. Pat. No. 4,407,579, granted Oct. 4, 1983, appears to solve this problem by providing a film cassette wherein manual rotation of the spool in the unwinding direction can serve to advance the film leader out of the cassette shell. Specifically, the spool is comprised of two pieces constructed to telescopically receive one another. Each piece includes a radially extending flange which is adapted to lie closely adjacent to but not in engagement with one of the opposite sides of the film roll. A trailing end of the film roll is attached to the spool and a leading end of the roll rests against a cylindrical insert located between the two flanges and the cassette shell. The insert restricts the maximum diameter of the film roll to a value less than the diameter of the flanges and includes a slot leading to the light-trapped film passage opening of the cassette shell. To move the leading end of the film roll into the slot and through the light-trapped opening, to make it available outside of the film cassette, one must manually grasp the opposite ends of the spool and move the two pieces of the spool axially toward one another until the flanges are axially positioned in firm contact with the opposite sides of the film roll. While maintaining this inwardly directed manual pressure against the two pieces of the spool, one then must rotate the spool relative to the cassette shell in an unwinding direction. As a result, the leading end of the film roll will be rotated relative to the insert, causing it to be advanced into the slot of the insert and through the light-trapped opening of the cassette shell to the outside of the film cassette.

Although the film cassette disclosed in U.S. Pat. No. 4,407,579 includes an integral means whereby the leading end of the film roll may be retrieved from within the cassette shell, operation of that means is difficult because it requires a fair amount of manual dexterity. Moreover, since the operation must be performed manually it can only be accomplished prior to loading the film cassette into a camera.

SUMMARY OF THE INVENTION

The invention advantageously solves the prior art problems described above by providing an improved film cassette wherein a film spool which, simply when rotated in a film unwinding direction, automatically advances the filmstrip out of the cassette shell. With such an improvement, the prior art requirement for a protruding film leader is eliminated and the operation to retrieve the film leader from within the cassette shell need not be performed manually.

According to the invention, there is generally provided an improved film cassette wherein (a) a cassette shell has a film passage opening, (b) a film spool is rotatable within the cassette shell in a film unwinding direction and has a pair of coaxially spaced radial flanges, (c) a convoluted film roll is coiled about the spool between the two flanges and has a leading end, (d) two parts of the spool are fixed to the respective flanges and at least one of the parts is movable axially toward the other part to move at least one of the flanges axially closer to the other flange and into a firm frictional relation with an outermost convolution of the film roll to thereby enable rotation of the spool in the unwinding direction to propel the leading end of the roll from the film passage opening, and wherein the improvement comprises:

the two parts of the spool include cooperating means supporting the two parts for limited rotation of one of the parts relative to the other prt in the unwinding direction to simultaneously move at least one part axially toward the other part until at least one of the flanges is moved into the firm frictional relation with the outermost convolution of the film roll, whereby further rotation of one of the parts in the unwinding direction will rotate the spool in the same direction to propel the leading end of the film roll from the film passage opening. More specifically, the cooperating means includes respective rotation-responsive camming means located on the two parts of the spool for causing at least one of the parts to move axially toward the other part in response to rotation of one of the parts relative to the other part in the unwinding direction and for enabling the parts to rotate as a unit in the unwinding direction after at least one of the flanges is moved into the firm frictional relation with the outermost convolution of the within the outermost convolution of the film roll.

The invention is preferably embodied in a 35 mm film cassette wherein the leading end of the film roll coiled about the film spool is located within the cassette shell. The film spool is comprised of two coaxial pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to clamp the film roll at its opposite sides. As a result, the leading end of the film roll will be rotated past a stripper-guide which strips the leading end from between the flanges and guides it through a light-trapped opening in the cassette shell. Thus simply by rotating the film spool in the unwinding direction the leading end will automatically be advanced to the outside of the film cassette.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
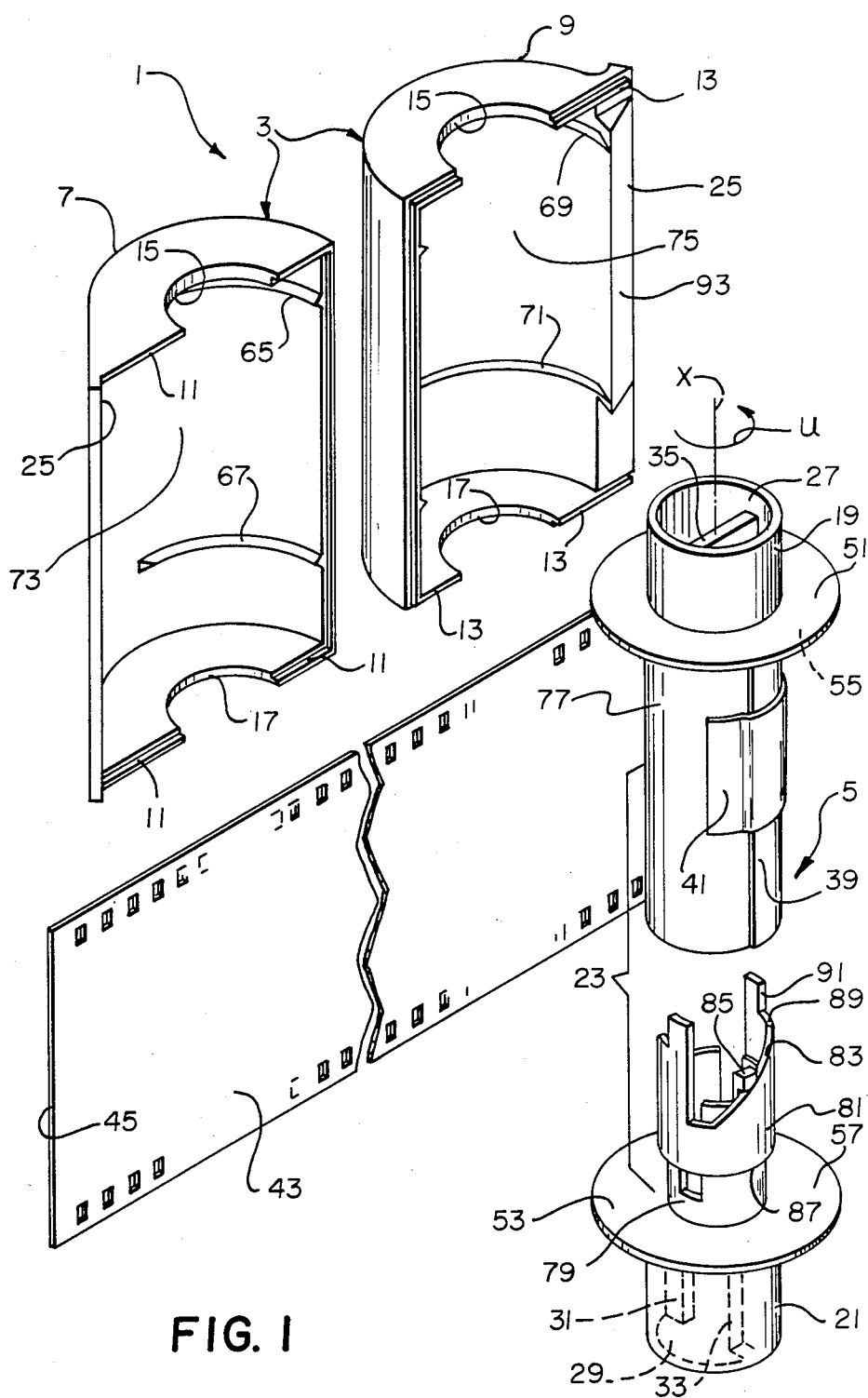
FIG. 1 is an exploded perspective view of an improved film cassette according to a preferred embodiment of the invention, illustrating the two halves of a cassette shell and a film spool.
Figure 2:
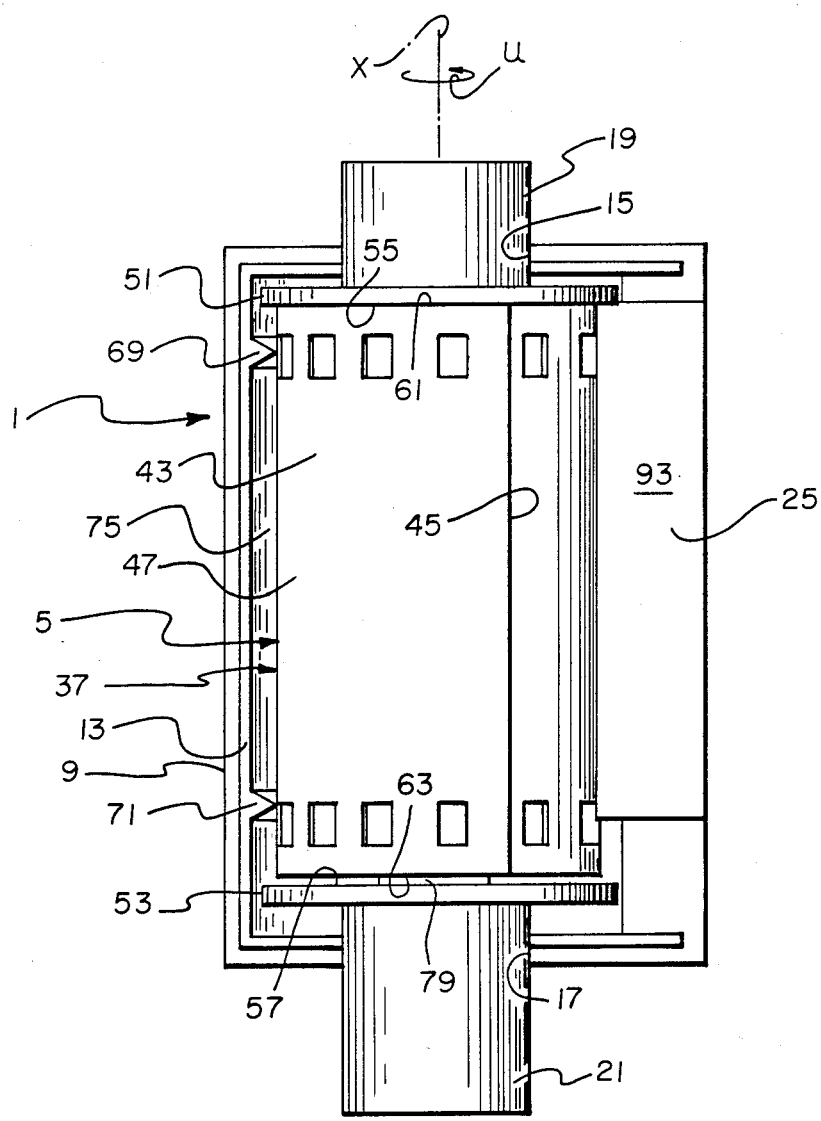
FIG. 2 is an elevation view of the improved film cassette, illustrating the film spool and one-half of the cassette shell.
Figure 3:
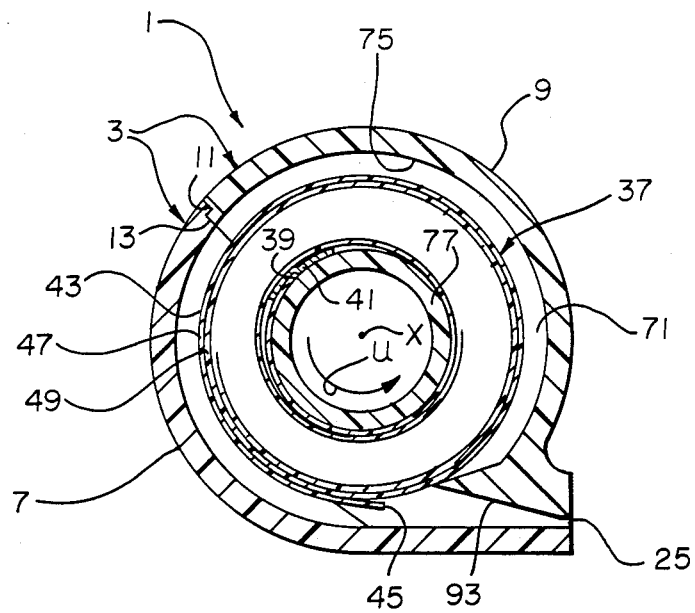
FIG. 3 is an end view in cross-section of the improved film cassette.

Referring now to the drawings, FIGS. 1–3 depict an improved 35 mm film cassette 1 comprising a light-tight cassette shell 3 and a film spool 5 rotatable about an axis X within the cassette shell. The cassette shell 3 consists of two shell halves 7 and 9 which are mated along respective stepped edge portions 11 and 13. The mated halves 7 and 9 define upper and lower aligned openings 15 and 17 for upper and lower opposite end extensions 19 and 21 of a spool core or hub 23. Also, they define a light-trapped film passage slit or mouth 25. The light-trapping means for preventing ambient light from entering the film passage slit 25, although not shown, may be a known flocking or plush material which lines the interior of the slit. One example of such a material is illustrated in U.S. Pat. No. 4,407,579.

The spool core 23 as shown in FIG. 1 includes upper and lower coaxal holes 27 and 29 opening at the upper and lower opposite end extensions 19 and 21 of the spool core. A pair of spaced keying ribs 31 and 33 integrally formed with the spool core 23 are located within the lower coaxial hole 29, and a single keying rib 35 similarly formed with the spool core is located within the upper coaxial hole 27. The several keying ribs 31, 33, and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film having a uniform width is wound about the spool core 23. As indicated in FIGS. 1 and 3, the film roll 37 has an inner or trailing end 39 attached to the spool core 23 by a suitable piece of adhesive tape 41 and a film leader 43. The film leader 43 has a leading or forward end 45 and comprises 2–3 convolutions of the film roll 37. One of these leader convolutions is the outermost convolution 47 and another of them is the next inward succeeding convolution 49.

A pair of identical flanges 51 and 53 radially extending from the spool core 23 are coaxially spaced to locate their respective inner faces 55 and 57 adjacent opposite sides 61 and 63 of the film roll 37. See FIG. 2. The two flanges 51 and 53 are slightly concave-shaped and are adapted to insure that the filmstrip travels in directions perpendicular to the axis X of the film spool 5 as the filmstrip is unwound from or rewound onto the film spool. As indicated in FIG. 1, the upper flange 51 is located beneath the upper opening 15 of the cassette shell 3 and the lower flange 53 is located above the lower opening 17 of the shell.

The maximum diameter of the film roll 37 is restricted to a value less than the diameter of the two flanges 51 and 53 by two pairs of arcuate ribs 65, 67 and 69, 71, fixed to the two halves 7 and 9 of the cassette shell 3 at their respective inner walls 73 and 75. The four ribs 65, 67, 69, and 71 protrude radially between the two flanges 51 and 53 to circumferentially confine the outermost convolution 47 of the film rill 37 to thereby prevent the outermost convolution from radially expanding or clock-springing beyond the peripheries of the flanges to the shell walls 73 and 75. See FIGS. 1 and 2. Preferably, the respective ribs 65, 67, 69, and 71 are relatively smooth at their respective areas of contact with the outermost convolution 47.

As shown in FIG. 1, the spool core 23 is comprised of two hollow cylindrical coaxial pieces 77 and 79. The first spool piece 77 is integrally formed with the upper flange 52 and the second piece 79 is integrally formed with the lower flange 53. An annular fixed insert 81 secured to the inside of the first spool piece 77 (or integrally formed therewith) is constructed to telescopically receive the second spool piece 79 in order to vary the axial distance between the upper and lower flanges 51 and 53. The specific means for varying the axial distance between the two flanges 51 and 53 consists of an inclined cam edge or ramp 83 located on the annular insert 81 and a cam follower tab 85 located on the second spool piece 79.

If the second spool piece 79 is initially rotated relative to the first spool piece 77 (including its annular insert 81) in the unwinding direction U, the interaction between the cam edge 83 and the follower tab 85 will cause the second spool piece to be further received within the annular insert, i.e. the second spool piece will be moved axially toward the first spool piece, thereby reducing the axial distance between the two flanges 51 and 53. The second spool piece 79 can be moved axially toward the first spool piece 77 until the lower flange 53 is moved into a firm compressive relation with the one side 63 of the film roll 37. At this time, the lower flange 53 preferably is disposed in abutment against a lower edge 87 of the annular insert 81. See FIG. 1. Moreover, the follower tab 85 will have come to rest atop a plateau edge 89 and alongside a stop edge 91 of the annular insert 81. The stop edge 91 serves to prevent continued rotation of the second spool piece 79 relative to the first spool 77 (including its annular insert 81) in the unwinding direction U, thereby causing further rotation of the second spool piece in the unwinding direction to similarly rotate the first spool piece. The plateau edge 89 serves to trap the follower tab 85 in order to secure the lower flange 53 in its compressive relation with the one side 63 of the film roll 37.

If the second spool piece 79 is rotated in a winding direction opposite to the unwinding direction U after its follower tab 85 has come to rest atop the plateau edge 89, the follower tab will be moved off the plateau edge. Thus the lower flange 53 will no longer be secured in its compressive relation with the one side 63 of the film roll 37.

Operation

When the second spool piece 79 is initially rotated relative to the first spool piece 77 (including its annular insert 81) in the unwinding direction U, the interaction between the cam edge 83 of the annular insert and the follower tab 85 of the second spool piece will cause the respective flanges 51 and 53 to firmly clamp the film roll 37 at its opposite sides 61 and 63. The outermost convolution 47 of the film roll 37 may be slightly transversely pinched because of the concave shape of the two flanges 51 and 53. In any event, the leading end 45 of the film leader 43 will tend to straighten longitudinally and therefore will slightly separate or lift of the outermost convolution 47. However, the four ribs 65, 67, 69, and 71 prevent the leading end 45 from contacting the shell walls 73 and 75.

Continued rotation of the second spool piece 79 in the unwinding direction U will similarly rotate the first spool piece 77. Moreover, the film roll 37 will be rotated in the unwinding direction U to advance its leading end 45 to a stripper-guide 93 integrally formed with the cassette half 7. The stripper-guide 93 then will strip the leading end 45 from between the two flanges 51 and 53 and guide it through the film passage slit 25 to the outside of the cassette shell 3. Since the respective flanges 51 and 53 firmly clamp the film roll 37, especially along the outermost convolution 47, sufficient film thrust is provided to propel the leading end 45 past the stripper-guide 93 and out of the cassette shell 3.

The invention has been described with reference to a preferred embodiment. However, it will be appreciated that variations and modifications can be effected within the ordinary skill in the art without departing from the scope of the invention. For example, the respective inner faces 55 and 57 of the two flanges 51 and 53 may be provided with a surface having a high coefficient of friction as suggested in U.S. Pat. No. 4,407,579. Also, the leading end 45 of the film leader 43 could initially be located entirely within the film passage slit 25 or extending very slightly outside the cassette shell 3 rather than as shown in FIG. 3.

I claim:

1. An improved film cassette wherein (a) a cassette shell has a film passage opening, (b) a film spool is rotatable within said cassette shell in a film unwinding direction and has a pair of coaxially spaced radial flanges, (c) a convoluted film roll is coiled about said spool between said two flanges and has a leading end, (d) two parts of said spool are fixed to said respective flanges and at least one of said parts is movable axially toward the other part to move at least one of the flanges axially closer to the other flange and into a firm frictional relation with an outermost convolution of said film roll to thereby enable rotation of the spool in the unwinding direction to propel said leading end from said film passage opening, and wherein the improvement comprises:

said two parts of the spool include cooperating eans supporting the two parts for limited rotation of one of said parts relative to the other part in the unwinding direction to simultaneously move at least one part axially toward the other part until at least one of said flanges is moved into said firm frictional relation with the outermost convolution of said film roll, whereby further rotation of one of said parts in the unwinding direction will rotate said spool in the same direction to propel said leading end from said film passage opening.

2. The improvement as recited in claim 1, wherein said two flanges have respective faces located adjacent opposite sides of said film roll, each of said faces being slightly concave-shaped.

3. The improvement as recited in claim 1, wherein said cooperating means includes rotation-responsive means located on said two parts of the spool for causing at least one of said parts to move axially toward the other part in response to rotation of one of the parts relative to the other part in the unwinding direction and for enabling said parts to rotate as a unit in the unwinding direction after at least one of said flanges is moved into said firm frictional relation with the outermost convolution of said film roll.

4. The improvement as recited in claim 3, wherein said rotation-responsive means includes axial restraining means for maintaining said two parts of the spool in a fixed axial relation to prevent at least one of the parts from being moved axially away from the other part after at least one of said flanges is moved into said firm frictional relation with the outermost convolution of said film roll.

5. The improvement as recited in claim 4, wherein said axial restraining means discontinues said fixed axial relation between the two parts of said spool in response to rotation of one of said parts relative to the other part in a film winding direction opposite to the unwinding direction.

6. The improvement as recited in claim 1, wherein said cassette shell includes relatively low friction ribs which protrude between said two flanges to radially confine the outermost convolution of said film roll to thereby prevent said outermost convolution from radially expanding beyond the flanges to the cassette shell.

7. The improvement as recited in claim 1, wherein said cooperating means includes rotation-responsive means located on said two parts of the spool for allowing rotation of one of said parts relative to the other part in the unwinding direction before at least one of said flanges is moved into said firm frictional relation with the outermost convolution of said film roll and for preventing rotation of one of said parts relative to the other part in the same direction after at least one of said flanges is moved into the frictional relation with said outermost convolution.

8. The improvement as recited in claim 1, wherein said respective flanges are adapted to clamp said film roll at opposite sides of the roll when at least one of the flanges is positioned in said firm frictional relation with the outermost convolution of said film roll, and said cooperating means includes axial restraining means responsive to movement of at least one of said flanges into the frictional relation with said outermost convolution for establishing a fixed axial relation between said two parts of the spool to prevent said film roll from urging one of the flanges axially away from the other flange.

9. The improvement as recited in claim 8, wherein said axial restraining means discontinues said fixed axial relation between said two parts of the spool in response to rotation of one of the parts relative to the other part in a film winding direction opposite to the unwinding direction to thereby allow said film roll to urge one of said flanges axially away from the other flange.

* * * * *